Nov. 13, 1934.  J. BALTON  1,980,740
MOLD FOR THE MANUFACTURE OF THREE-POCKET ICE CREAM CONES
Filed Oct. 13, 1933
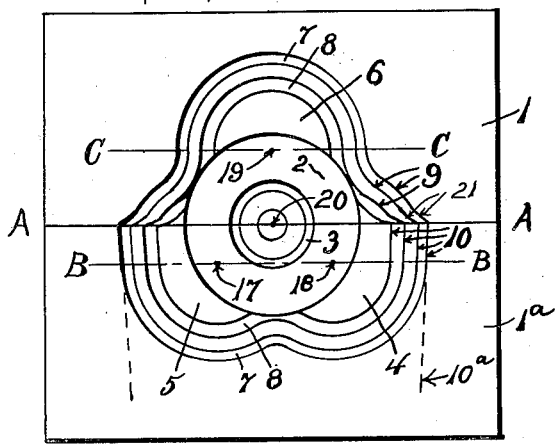
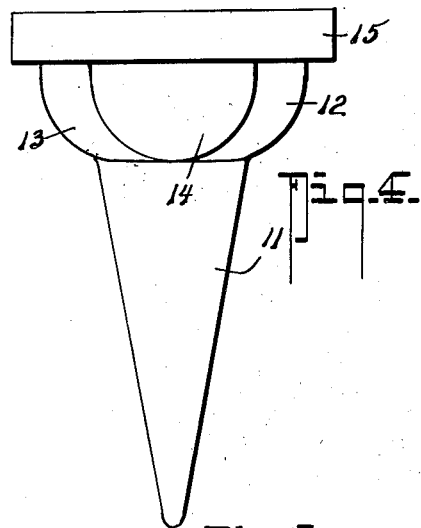
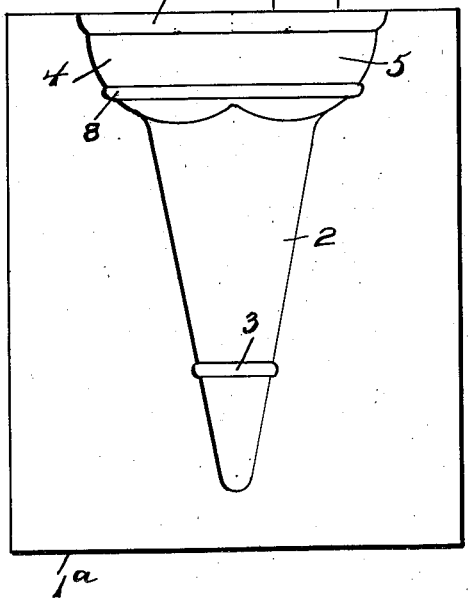
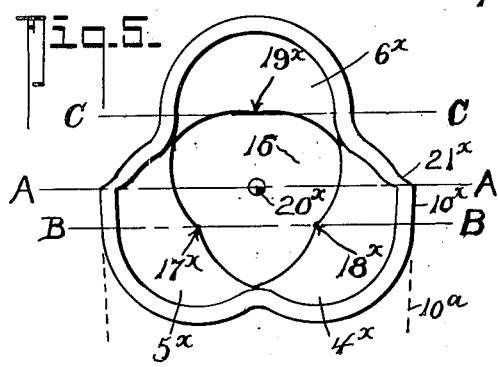
Inventor
James Balton
By Albert E Dieterich
Attorney Patented Nov. 13, 1934

1,980,740

UNITED STATES PATENT OFFICE

1,980,740

MOLD FOR THE MANUFACTURE OF THREE-POCKET ICE CREAM CONES

James Balton, Baltimore, Md., assignor, by direct and mesne assignments, of one-fourth to Joseph Shapiro, Baltimore, Md., one-fourth to Issac Shapiro, Chicago, Ill., and one-fourth to Nathan Shapiro and one-fourth to Samuel Shapiro, both of Chelsea, Mass.

Application October 13, 1933, Serial No. 693,520

5 Claims. (Cl. 107—66)

I have devised an ice cream cone consisting of a single stem with three spherical-segment bowls or heads symmetrically arranged around the axis of the stem in clover-leaf formation; each pocket merges with the stem and with one another.

Considerable difficulty has been encountered in the manufacture of such cones. They can be made in so-called solid molds where they have to be extracted lengthwise of the mold cavity (usually by hand) and it is possible to make them in three-part split female molds. However, machinery to operate three-part split female molds automatically is too expensive to construct and the difficulty of locking the female parts tightly together and the difficulty in properly distributing the heat are too great to overcome in a practical manner.

My invention therefore has for its object to provide an especially designed or constructed two-part female mold of the type now almost universally employed in baking ice cream cones of the ordinary kind or those of the so-called double-header type (two pockets on a single stem). At first blush it might seem a simple matter to form the mold cavity in a two-part split mold to bake a three pocket cone. If the outside of the cone were provided with a single triangular head it would be a simple matter to split the mold on a plane passing through the axis of the stem, bisecting one of the angles and passing through the opposite side at right angles thereto. This method of dividing the mold, however, will not work with spherical heads of a three-pocket cone such as I have designed, as above referred to, since some of the portions of the cone heads would interlock with one or the other of the mold halves and could not be extracted by parting the mold sections as is done with single and double pocket cones.

After considerable study and experimentation I have found that by very slightly changing the form of two of the three pockets, without however losing the general spherical form and the symmetry of the same with respect to one another and to the third pocket, I can so divide the mold that one half of the cone is molded and baked in each mold half without interlocking with the same, and in such manner that it may be extracted according to the well-known Bruckman method (see Letters Patent No. 1,071,027) as readily as the single and double headed cones can be.

I have accomplished the desired result by separating the mold sections on a plane containing the axis of the stem cavity and paralleling a second plane passing through the axes of two only of the pocket or head cavities and by making all horizontal lines in the molding surface of the mold from said second plane diverge toward the plane on which the mold sections are separated and similarly diverging or curving out a part of the adjacent portions of the wall of the other mold section from a plane paralleling the plane of separation and passing through the axis of the third head recess so that the two sections of the mold cavity will match one another.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a plan of a two-part female mold constructed in accordance with my invention.

Figure 2 is an elevation of one section of the mold.

Figure 3 is an elevation of the other section of the mold.

Figure 4 is an elevation of the core employed with the mold.

Figure 5 is a plan of a cone made in the mold.

In the drawing in which like numerals and letters of reference indicate like parts in all of the figures, 1 and 1a are the two halves of the mold which comprise my present invention. These mold sections, when held together, at their plane of separation have between them a cavity 2 to form the conical stem of the cone, a groove 3 to form a reinforcing ring on the stem (this may be omitted if desired) and three spherical-segment head cavities 4, 5 and 6, and parallel horizontal recesses to form the mouth-reinforcing ring 7 and the nesting ring 8 now commonly used in ice cream cones.

The plane A—A on which the mold is parted lies parallel to plane B—B which includes the axes 17 and 18 of two of the bowls or head cavities, say 4 and 5, those portions 10 of the molding surface in section 1a (which contain the major parts of the head cavities 4 and 5) between planes A—A and B—B being parallel or preferably diverging from plane B—B to plane A—A; the spherical portions 9 of the bowl cavities 4 and 5 which lie in mold section 1 are curved outwardly or diverge outwardly as at 21 to merge with the surfaces 10—10. By this arrangement it will be observed that all surfaces of mold section 1 which aid in forming the spherical heads 4x—5x of the cone (head 6x being formed in bowl section of mold section 1) diverge toward the mold-parting plane A—A from the recess 6.

The axes of the mold recesses 4, 5 and 6 are indicated respectively by 18, 17 and 19 in Figure 1, and those of the formed cone are indicated respectively by 18x, 17x and 19x in Figure 5, the axes of the stem 16 of the cone being indicated by 20x.

The divergence of the surfaces 10 of the mold section 1a (10x of the cone in Figure 5) are indicated by dotted lines 10a in Figures 1 and 5.

The core is of the usual form, comprising the conical stem 11 and the bowl forming spherical bodies 12, 13 and 14, together with a cap 15, which latter acts as a closure for the mold cavity.

The centers of curvature (axes) of the pockets of the cavities 4, 5 and 6 preferably lie equidistant from the center of curvature (axis) of the stem. By this arrangement the symmetry of the pockets 4x and 5x of the cone is not lost and the general cloverleaf form is retained.

When in this specification and in the claims I refer to a two-part split female mold I have reference to those molds which separate from the molded article by a movement transversely of the axis of the cone, or, in other words, those molds in which the cone is extracted cross-wise of the mold cavity instead of lengthwise thereof (in the direction of the axis of the cone) as is done with the solid molds.

From the foregoing description, taken in connection with the accompanying drawing, it is thought that the construction and advantages of the present invention will be clear to those skilled in the art to which it appertains.

What I claim is:

1. A two-part split female mold containing a molding cavity comprising a stem and three bowl or head portions, the axis of the stem cavity lying in the parting plane of the mold, one complete bowl or head portion cavity and parts of the two other bowl or head portion cavities lying in one mold half and the remaining parts of the said other two bowl or head portion cavities lying in the other half of the mold.

2. A two-part split female mold containing a molding cavity comprising a stem and three bowl or head portions, the axis of the stem cavity lying in the parting plane of the mold, one complete bowl or head portion cavity and parts of the two other bowl or head portion cavities lying in one mold half and the remaining parts of the said other two bowl or head portion cavities lying in the other half of the mold with the axes of the said two bowl or head portion cavities lying in a plane parallel to the mold-parting plane.

3. A two-part split female mold containing a molding cavity comprising a stem and three bowl or head portions, the axis of the stem cavity lying in the parting plane of the mold, one complete bowl or head portion cavity and parts of the two other bowl or head portion cavities lying in one mold half and the remaining parts of the said other two bowl or head portion cavities lying in the other half of the mold with the axes of the said two bowl or head portion cavities lying in a plane parallel to the mold-parting plane and the molding surfaces of the said two bowl or head portion cavities of the mold half diverging from said last named plane to the mold-parting plane.

4. A two part female mold having a stem-forming cavity and three head or bowl cavities merging with one another and with the stem and of general clover-leaf form in plan view, the axis of the stem cavity lying in the mold-parting plane, the axis of one of said bowl portions lying in a plane at right angles to the mold-parting plane and passing through the axis of the stem cavity, the axes of the other two bowl cavities lying in a plane parallel to the mold-parting plane.

5. A two-part female mold having a stem-forming cavity and three head or bowl cavities merging with one another and with the stem and of general clover-leaf form in plan view, the axis of the stem cavity lying in the mold-parting plane, the axis of one of said bowl portions lying in a plane at right angles to the mold-parting plane and passing through the axis of the stem cavity, the axes of the other two bowl cavities lying in a plane parallel to the mold-parting plane, those portions of the molding surfaces of the said two head cavities which lie between said third-named plane and said mold-parting plane diverging from said third-named plane to said mold-parting plane.

JAMES BALTON.